(12) United States Patent
Brück et al.

(10) Patent No.: US 6,701,706 B2
(45) Date of Patent: Mar. 9, 2004

(54) EXHAUST-GAS PURIFICATION SYSTEM WITH DELAYED RECORDING OF MEASURED VALUES AND METHOD FOR DETERMINING POLLUTANT CONCENTRATION IN EXHAUST GAS

(75) Inventors: Rolf Brück, Bergisch Gladbach (DE); Wolfgang Maus, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 10/308,054

(22) Filed: Dec. 2, 2002

(65) Prior Publication Data

US 2003/0084659 A1 May 8, 2003

Related U.S. Application Data

(63) Continuation of application No. PCT/EP01/05689, filed on May 18, 2001.

(30) Foreign Application Priority Data

Jun. 2, 2000 (DE) ........................................ 100 27 410

(51) Int. Cl.[7] ................................................ F01N 3/00
(52) U.S. Cl. ........................... 60/276; 60/274; 73/23.31
(58) Field of Search .................... 60/274, 276, 277, 60/285; 73/113, 118.1, 23.31, 23.32, 23.21

(56) References Cited

U.S. PATENT DOCUMENTS 4,691,562 A * 9/1987 Abthoff et al. ............ 73/118.1
4,739,614 A * 4/1988 Katsuno et al. ............ 60/274
5,228,286 A * 7/1993 Demura ...................... 60/285
5,351,526 A 10/1994 Krohm et al.
5,385,016 A 1/1995 Zimlich et al.
5,475,975 A * 12/1995 Nasu ........................ 60/285
5,894,727 A 4/1999 Zimlich
6,003,307 A * 12/1999 Naber et al. ................ 60/274
6,195,988 B1 * 3/2001 Yasui et al. ................ 60/285
6,304,815 B1 * 10/2001 Moraal et al. .............. 60/285
6,357,429 B1 3/2002 Carnevale et al.
6,550,237 B1 * 4/2003 Adamczyk et al. .......... 60/277

FOREIGN PATENT DOCUMENTS

| EP | 0 636 771 A1 | 2/1995 |
| FR | 2 773 847 A1 | 7/1999 |
| JP | 01 321 370 | 12/1989 |
| JP | 11 294 149 | 10/1999 |

* cited by examiner

Primary Examiner—Thomas Denion
Assistant Examiner—Tu M. Nguyen
(74) Attorney, Agent, or Firm—Laurence A. Greenberg; Werner H. Stemer; Ralph E. Locher

(57) ABSTRACT

A system and a method are provided for determining a pollutant concentration of an exhaust gas at a first position of an exhaust-gas system of an internal combustion engine. A sensor for determining the pollutant concentration is placed at a second position, downstream of the first position, in the exhaust-gas system. The sensor records a measured value, which is then transmitted to a time function element taking into account the time delay between recording a measured value at the first and second positions and transmitting the measured value, temporally correlated with other undelayed measured values, to a diagnosis unit. Sensitive gas sensors can thus be placed at cooler positions of the exhaust-gas system that are less exposed to vibration and can nevertheless determine the pollutant concentration at another position.

25 Claims, 2 Drawing Sheets

EXHAUST-GAS PURIFICATION SYSTEM WITH DELAYED RECORDING OF MEASURED VALUES AND METHOD FOR DETERMINING POLLUTANT CONCENTRATION IN EXHAUST GAS

CROSS-REFERENCE TO RELATED APPLICATION

This application is a continuation of copending International Application No. PCT/EP01/05689, filed May 18, 2001, which designated the United States and was not published in English.

BACKGROUND OF THE INVENTION

Field of the Invention

The invention relates to an exhaust system for the cleaning or purification of an exhaust gas, including an exhaust pipe which conducts the exhaust gas from an internal combustion engine downstream into the environment. The exhaust pipe has a sensor for determining the pollutant concentration at a first position. The invention also relates to a method for determining pollutant concentration in the exhaust gas. Exhaust systems and methods of that type are used in particular in automotive engineering.

Monitoring of exhaust systems is becoming increasingly important due to increasingly stringent exhaust guidelines and statutory limitations, which restrict pollutant concentrations in the exhaust gas that is ultimately released to the environment. In many cases, sensors are used for that purpose, for example to monitor the functionality of components for converting the pollutants in the exhaust gas or transmitting recorded measured values in connection therewith directly to an engine management system, which takes into account the measured data received when controlling the operating performance of the internal combustion engine. The concentrations of various pollutants in the exhaust gas are also measured, in addition to the temperature and pressure of the exhaust gas in the exhaust system. Examples of pollutants of that type are various hydrocarbons or nitrogen oxides. Gas sensors, in particular for determining the concentration of hydrocarbons and nitrogen oxides in the exhaust gas, are particularly temperature-sensitive and pressure-sensitive, with the result that the extent to which they can be used in an exhaust system is limited.

It is known to transmit the recorded measured values to a diagnosis unit in order to monitor the operation of the exhaust system and the functionality of the sensors. The received data are, for example, compared with stored information. If the diagnosis unit identifies malfunctions, they are either displayed or a suitable engine management system is used to determine the cause of the malfunction and counteract it by suitable measures.

SUMMARY OF THE INVENTION

It is accordingly an object of the invention to provide an exhaust-gas purification system with delayed recording of measured values and a method for determining pollutant concentration in exhaust gas, which overcome the hereinafore-mentioned disadvantages of the heretofore-known systems and methods of this general type and which ensure monitoring of an exhaust system even with temperature-sensitive or pressure-sensitive sensors, having recorded measured values being transmitted to an engine management system in such a manner that they are correlated to other measured values.

With the foregoing and other objects in view there is provided, in accordance with the invention, an exhaust system for purifying an exhaust gas, comprising an exhaust pipe conducting exhaust gas from an internal combustion engine downstream into the environment. The exhaust pipe has a first position and a second position. A sensor is disposed at the second position for determining a pollutant concentration at the first position. A time function element is connected to the sensor and to a diagnosis unit for taking into account a time difference between a measured value recording at the first and second positions and transmitting the recorded measured value, correlated to other undelayed measured values, to the diagnosis unit.

As has already been explained in the introduction hereto, known sensors cannot be used at any desired position in an exhaust system. This may make it necessary to position the temperature-sensitive and pressure-sensitive sensors at positions in the exhaust system which are at a distance from the desired measurement position. In this way, the service life of the sensors can be extended.

In most cases, the measured values recorded by the sensors are transmitted to a higher-level diagnosis unit. The measured values are also analyzed in this diagnosis unit. In order to achieve a valid result, in many cases a plurality of measured values are set in a relationship with respect to one another. Therefore, it is particularly important for the corresponding measured values to be correlated to one another in terms of time.

Since the sensor at the second position records the pollutant concentration at a different time than the measured values which are set in relationship with the recorded pollutant concentration, the time difference between an imaginary measured value recording at the first position and the measured value recording which actually took place at the second position, is taken into account with the aid of a time function element. The time difference is not constant, since the flow rate of the exhaust gas in the exhaust system varies as a function of the driving operating state. The time function element ensures that the correct, temporally correlated measured values are set in relationship with one another in the diagnosis unit.

In accordance with another feature of the invention, the sensor for determining the pollutant concentration is a gas sensor. These sensors are particularly temperature-sensitive and pressure-sensitive. Therefore, using a gas sensor close to the engine and directly downstream of a catalytic converter, where temperatures of from 900° C. to 1000° C. prevail, causes problems. The combination of a sensor and a time function element ensures the functionality of the sensor over a long period and at the same time allows the measured values to be analyzed in conjunction with other measured values from the exhaust system.

In accordance with a further feature of the invention, the sensor is suitable for recording the nitrogen oxide concentration in the exhaust gas. In this context, the nitrogen oxide concentration is particularly important, since this pollutant can only be converted with difficulty, especially during the cold-start phase, and it may be necessary to adapt the operating performance of the internal combustion engine accordingly.

In accordance with an added feature of the invention, the sensor is suitable for recording hydrocarbon concentration. This makes it possible, for example, to assess the operating performance of the internal combustion engine, since the concentration of unburnt or only partially burnt hydrocarbons is a measure of the quality of the combustion operations.

In accordance with an additional feature of the invention, the exhaust system has at least one component for at least partially converting the pollutants. It is particularly advantageous to construct at least one component as a catalytic converter. For example, the catalytic converter removes from the exhaust gas carbon monoxide and nitrogen oxide, which are present as a result of incomplete combustion of the fuel. The catalytic converter promotes a reaction between nitrogen oxide and carbon monoxide to form molecular nitrogen and carbon dioxide.

In accordance with yet another feature of the invention, the first position (desired position for taking a measured value) is disposed directly downstream of a component for at least partially converting the pollutants, and the sensor is disposed downstream of a muffler. It is necessary to record measured values directly downstream of a catalytic converter, for example, if the functionality of the catalytic converter is to be monitored. In order to improve the light-off performance of catalytic converters of this type immediately after the internal combustion engine has been started, such catalytic converters are disposed as close as possible to the internal combustion engine, in order for the required temperature for catalytic conversion to be reached very quickly. In addition, the catalytic reaction leads to an increase in the exhaust-gas temperature. Accordingly, the exhaust gas immediately downstream of the catalytic converter is often at a temperature in the region of approximately 1000° C. According to the invention, the sensor is disposed downstream of a muffler and the maximum temperatures of the exhaust gas at this position are approximately 400° C. The time difference which the exhaust gas requires in order to flow from the component for converting a pollutant to the muffler is taken into account by the time function element.

In accordance with yet a further feature of the invention, the first position (desired position for the measured value to be taken) is disposed in a separate exhaust-gas inflow line directly downstream of the internal combustion engine, and the second position having the sensor is disposed directly upstream of a component for at least partially converting the pollutants. The separate exhaust-gas inflow lines connect the individual combustion chambers of the internal combustion engine to the exhaust pipe. In this way, the individual exhaust-gas flows are brought together and fed to the at least one component. Recording of measured values at the first position, i.e. directly downstream of the individual combustion chambers, would allow the combustion operation in each individual combustion chamber to be characterized. However, particularly high pressure fluctuations occur at this position as a result of the exhaust gas being discharged from the combustion chambers, and consequently a sensor at this position would be exposed to particularly high dynamic loads. Positioning the sensor further downstream reduces the dynamic load on the sensor. The time function element provides the recorded measured values in such a way that the desired conclusions as to the combustion operations can be drawn.

In accordance with yet an added feature of the invention, the diagnosis unit is connected to a control unit of the internal combustion engine. In this way, it is possible to counteract inefficient conversion of a pollutant or incomplete combustion which has been detected by the diagnosis unit. In this context, the control unit, by way of example, influences the quantity of fuel supply, the supply of primary and/or secondary air or a valve control which regulates incoming and outgoing flow of an air/fuel mixture and the exhaust gas.

In accordance with yet an additional feature of the invention, the temperature of the exhaust gas while the exhaust system is operating is lower at the second position than at the first position. Accordingly, the second position is, for example, disposed upstream of the first position, since the temperature generally falls at increasing distance from the internal combustion engine. In addition, it is possible for the second position to be disposed upstream of the first position if the temperature of the exhaust gas rises between the second position and the first position (for example as a result of a catalytic and exothermic reaction in a catalytic converter) or the second position is actively cooled.

In accordance with again another feature of the invention, pressure fluctuations while the exhaust system is operating are lower at the second position than at the first position. Pressure fluctuations of this type decrease at an increasing distance from the internal combustion engine, in particular downstream of components of the exhaust system which, for example, impart turbulence to the flow, such as, for example, a muffler. The service life of a sensor is therefore increased as a result of it being located at the second position.

In accordance with again a further feature of the invention, a measured-value pick-up for recording the pressure is disposed in the exhaust pipe. The measured-value pick-up records the pressure fluctuations of the pulsed exhaust-gas flow which are formed due to the temporally offset combustion in the individual combustion chambers of the internal combustion engine. This makes it possible to assign the measured pressure fluctuation to the combustion chamber which has produced the pressure fluctuation.

With the objects of the invention in view, there is also provided a method for determining pollutant concentration in an exhaust gas, which comprises providing an internal combustion engine exhaust system having a first position and a second position. A measured value is recorded with a sensor disposed at the second position for determining the pollutant concentration at the first position. The measured value is transmitted to a time function element taking into account a time difference between a measured value recording at the first and second positions. The measured value is transmitted, temporally correlated to other undelayed measured values, to a diagnosis unit.

The pollutant concentration in the exhaust gas is dependent in particular on the fuel/air mixture which is burnt. The recorded pollutant concentrations have to be set in a relationship with the corresponding fuel/air mixture in order to be evaluated. The time difference between the imaginary measured-value recording at the first position and the second position is substantially dependent on the velocity of the exhaust gas in the exhaust system. This velocity is not constant, but rather is dependent, for example, on the driving characteristics of the vehicle driver.

In accordance with another mode of the invention, the time function element determines the time difference which a unit volume of the exhaust gas requires, while the exhaust system is operating, to flow from the first position to the second position. The defined time difference identifies the corresponding other measured values which are set in correlation with the recorded measured value of the sensor at the second position.

In accordance with a further mode of the invention, the time difference is determined through the use of a stored data model. The data model includes, for example, characteristic measured-value profiles from preference or test runs for the exhaust system, which allows the measured values recorded while the exhaust system is operating to be assessed.

Furthermore, this data model includes, for example, limit values and/or tolerances which are to be maintained for statutory pollutant limits.

In accordance with an added mode of the invention, information about the volume of the exhaust system is stored in the data model. Information of this type about the dimensions of the exhaust system makes it possible to interpret the recorded measured values. It is therefore possible, for example, with the aid of the volume of the exhaust system, the temperature of the exhaust gas and the exhaust-gas mass flow, to draw conclusions as to the velocity of the exhaust gas and therefore the time difference. With a view toward determining the time difference between a measured-value recording at the first position and the second position, it is advantageous in particular to take into account the parameter relating to the partial volume of the exhaust system between these two positions in the data model.

In accordance with an additional mode of the invention, information about the operating performance of the components for at least partially converting the pollutants which are disposed in the exhaust system, is stored in the data model. For example, components of this type may be disposed between the first position and the second position. The change in the chemical composition of the exhaust gas caused by these components is taken into account on the basis of the information in the data model.

In accordance with still another mode of the invention, the exhaust-gas mass flow is determined on the basis of a quantity of the fuel/air mixture which is passed into the internal combustion engine. The quantitative relationships between the exhaust-gas mass flow and the fuel/air mixture which is burnt are known. The exhaust-gas mass flow is used, for example, for interpretation of the measured pollutant concentration.

In accordance with still a further feature of the invention, the exhaust-gas temperature in the exhaust system is recorded. In this context, the exhaust-gas temperature between the first position and the second position is of particular interest, since this temperature is used, for example, to determine the velocity of the exhaust-gas stream between these positions. If there is a particularly great temperature drop between these two positions, it is advantageous for the exhaust-gas temperature to be recorded at a plurality of positions between the first and second positions and for a mean to be formed if appropriate.

In accordance with still an added mode of the invention, the time difference is determined at least as a function of the exhaust-gas mass flow and/or the exhaust-gas temperature.

In accordance with still an additional mode of the invention, the diagnosis unit monitors the operating performance of at least one component for converting at least one pollutant component. For this purpose, for example, the recorded measured value profiles can be compared with stored measured value profiles of operationally reliable components. In particular, the measured values immediately after the internal combustion engine has started have a characteristic profile (light-off performance) which is suitable for monitoring the at least one component for converting a pollutant component.

In accordance with again another mode of the invention, the diagnosis unit is used to monitor the operating performance of the internal combustion engine. In this way, it is possible to prevent incorrect and incomplete combustion of the fuel.

In accordance with again a further mode of the invention, the individual combustion chambers of the internal combustion engine are monitored. Selective monitoring of the individual combustion chambers may help to locate the cause of a fault in the event of the pollutant concentration in the exhaust gas rising.

In accordance with again an added mode of the invention, the pressure in the exhaust system is additionally recorded at the second position by a measured-value pick-up, with the time difference being determined as a function of the recorded pressure. Pressure fluctuations which occur in the exhaust system substantially originate from the combustion operations of the fuel/air mixture in the individual combustion chambers. Accordingly, with the aid of these pressure fluctuations and the determined time difference, it is possible to relate increased pollutant concentrations to incorrect or incomplete combustion operations in a separate combustion chamber of the internal combustion engine.

In accordance with a concomitant mode of the invention, the diagnosis unit transmits data to a control device of the internal combustion engine which influences the operating performance of the internal combustion engine as a function of the data received. In this way, it is possible to counteract an increased pollutant concentration in the exhaust gas through the use of an adapted operating performance of the internal combustion engine.

Other features which are considered as characteristic for the invention are set forth in the appended claims.

Although the invention is illustrated and described herein as embodied in a exhaust-gas purification system with delayed recording of measured values and a method for determining pollutant concentration in exhaust gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
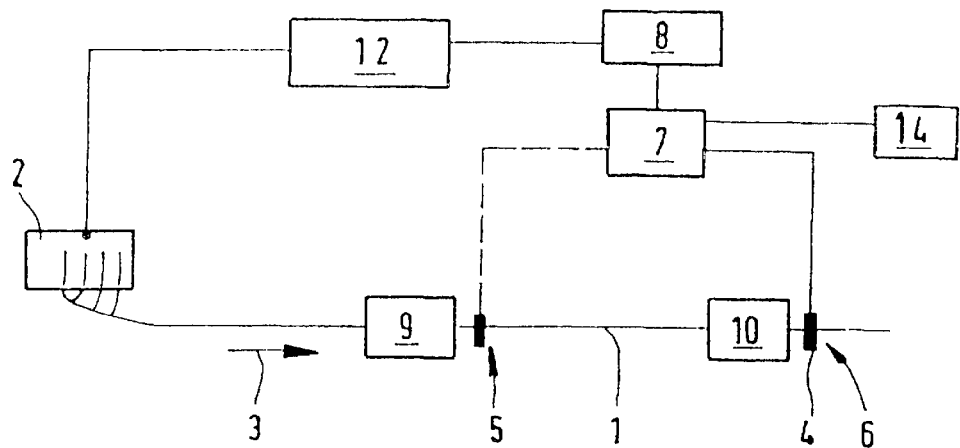
FIG. 1 is a block diagram of an exhaust system according to the invention.

Referring now to the figures of the drawings in detail and first, particularly, to FIG. 1 thereof, there is seen a diagrammatic depiction off the structure of an exhaust system according to the invention for purifying an exhaust gas. The illustrated exhaust system is an exhaust system of a motor vehicle. During operation, an internal combustion engine 2 generates an exhaust gas which is carried in an exhaust pipe 1 in a downstream direction 3 into the environment. The illustrated exhaust system includes a component 9, such as a catalytic converter, for converting at least one pollutant (carbon monoxide, hydrocarbons, nitrogen oxides). This component 9 is followed by a muffler 10 in the downstream direction 3. The muffler 10 reduces noise produced by the exhaust system.

In the illustrated exemplary embodiment, a concentration of a pollutant at a first position or point 5 is of interest. It is not possible to use a gas sensor at this first position 5, due to the high temperatures which exist directly downstream of the catalytic converter 9. The catalytic converter 9 catalytically converts the pollutants in the exhaust gas, with exothermic chemical reactions taking place which increase the temperature of the exhaust gas. According to the invention, a sensor 4 is disposed at a second position or point 6 following the muffler 10 in the downstream direction 3. Measured values recorded by the sensor 4 are transmitted to a time function element 7.

The time function element 7 takes into account the time difference which the exhaust gas requires to flow from the first position 5 to the second position 6. This time difference is determined by using information from a data model 14. The measured value being recorded is therefore transmitted to a diagnosis unit 8 in such a manner that it is correlated to other, undelayed recorded measured values.

The diagnosis unit 8 is connected to a control device 12 of the internal combustion engine 2. For example, if increased pollutant concentrations occur at the second position 6, this information is fed to the control device 12. The control device 12 influences the operating performance of the internal combustion engine 2 in order to counteract the increased pollutant concentration. In this way, the operating performance of the internal combustion engine can be regulated even with temperature-sensitive or pressure-sensitive sensors 4.

Figure 2:
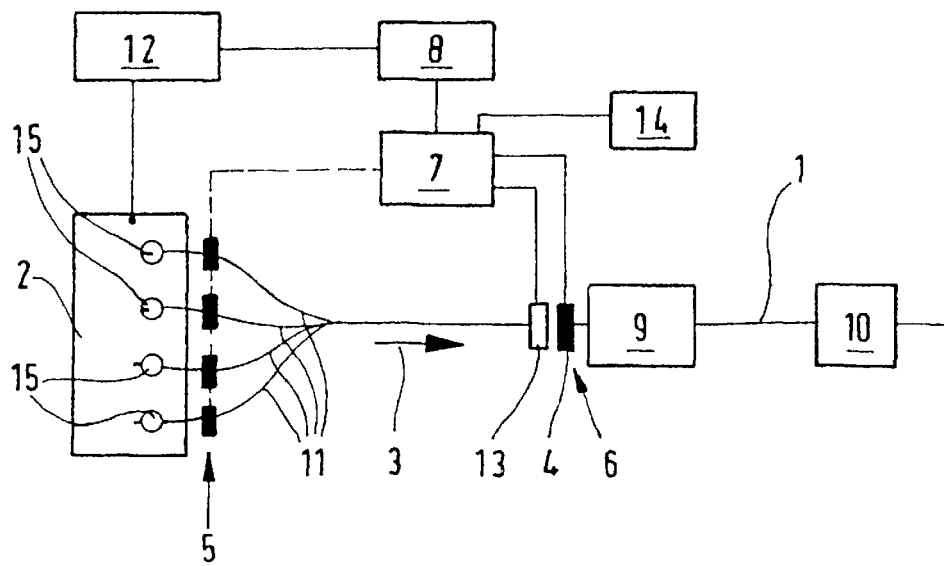
FIG. 2 is a block diagram of a further embodiment of the exhaust system according to the invention.

FIG. 2 shows a further exemplary embodiment of an exhaust system according to the invention. The internal combustion engine 2 has a plurality of combustion chambers 15 in which combustion of a fuel/air mixture takes place. The exhaust gas generated in the engine is brought together through separate exhaust-gas inflow lines 11 to an exhaust pipe 1. The exhaust gas is carried through a catalytic converter 9 and a muffler 10 into the environment in the downstream direction 3.

In this exemplary embodiment, the position of the desired measured-value recording (first position 5) is disposed in the separate exhaust-gas inflow lines 11. Known gas sensors, for example, cannot be used at this position, due to the temperature and pressure conditions which prevail there.

According to the invention, a sensor 4 is disposed at a second position 6 following the first position 5 in the downstream direction 3. The measured value recorded by the sensor 4 is transmitted to a time function element 7. The time difference between the imaginary measured-value recording at the first position 5 and the actual measured-value recording at the second position 6 is determined by using the information from a data model 14 and/or an additional measured-value pick-up 13, which records the pressure in the exhaust pipe 1 at the second position 6. The measured value recorded by the sensor 4 is transmitted from the time function element 7 to the diagnosis unit 8 in such a manner that it is correlated to other measured values. The diagnosis unit allows targeted control of the combustion operations in the combustion chambers 15 through the use of a control device 12 of the internal combustion engine 2.

Figure 3:
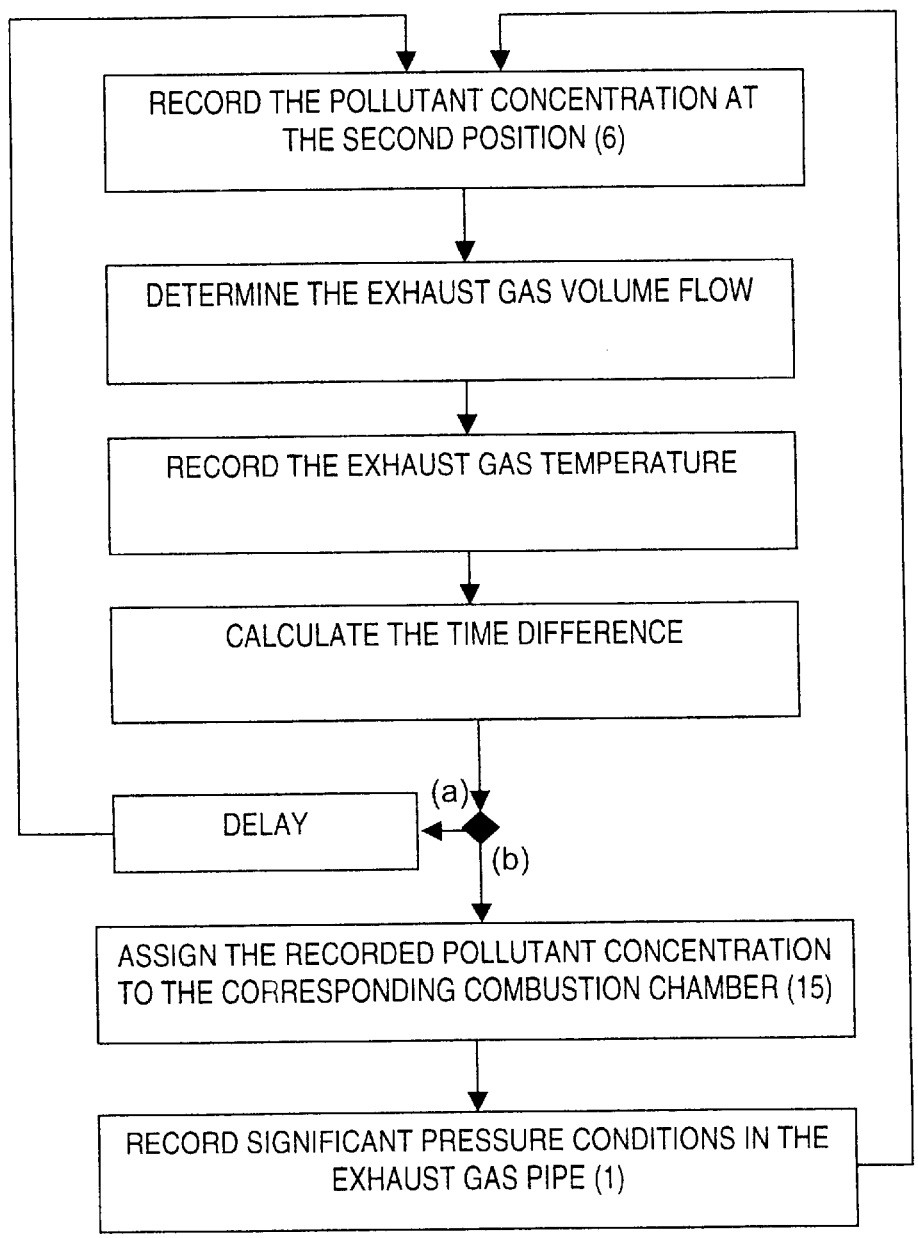
FIG. 3 is a flow diagram of one configuration of the method according to the invention for operating the exhaust system.

FIG. 3 shows a flow chart of one configuration of the method according to the invention for purifying an exhaust gas. The exhaust-gas mass or volume flow is determined starting from the recording of the pollutant concentration at the second position 6. In particular, information about the air/fuel mixture which is burnt is used for this purpose. Then, the exhaust-gas temperature between the first position 5 and the second position 6 is recorded. This data, if appropriate in combination with further information in the data model, makes it possible to calculate the time difference which the exhaust gas requires to flow from the first position 5 to the second position 6.

The time difference is calculated, for example, at time intervals which can be preset. If the method according to the invention is used, for example, to monitor the functioning of a catalytic converter 9, it is sufficient to provide a short delay (a) until the recording of the pollutant concentration at the second position 6 is commenced again. If the combustion operations in the combustion chambers 15 are being monitored, the recorded pollutant concentrations are assigned to the corresponding combustion chambers 15 after the time difference has been calculated. In this case, the cycle for recording the pollutant concentration is triggered, for example, by significant pressure states in the exhaust pipe 1 (b). The exhaust system is constructed with a measured-value pick-up 13 for this purpose.

With this device and method for determining the pollutant concentration of an exhaust gas, it is possible for sensitive gas sensors to be disposed at cooler positions, with less vibration, in the exhaust system. Nevertheless, information about hotter positions, with higher pressure loads, in the exhaust system, is obtained.

We claim:

1. An exhaust system for purifying an exhaust gas, comprising:
   an exhaust pipe conducting exhaust gas from an internal combustion engine downstream into the environment, said exhaust pipe having a first position and a second position;
   a sensor disposed at said second position for determining a pollutant concentration at said first position;
   a diagnosis unit; and
   a time function element connected to said sensor and to said diagnosis unit for taking into account a time difference between a measured value recording at said first and second positions and transmitting said recorded measured value, correlated to other undelayed measured values, to said diagnosis unit.

2. The exhaust system according to claim 1, wherein said second position experiences a lower exhaust gas temperature than said first position, during operation of the exhaust system.

3. The exhaust system according to claim 1, wherein said second position experiences lower exhaust gas pressure fluctuations than said first position, during operation of the exhaust system.

4. The exhaust system according to claim 1, which further comprises a component for at least partially converting the pollutants, said exhaust pipe including a separate exhaust-gas inflow line, said first position being disposed in said separate exhaust-gas inflow line directly downstream of the internal combustion engine, and said second position being disposed directly upstream of said component for at least partially converting the pollutants.

5. The exhaust system according to claim 1, which further comprises a control unit for the internal combustion engine, said diagnosis unit being connected to said control unit.

6. The exhaust system according to claim 1, which further comprises a measured-value pick-up disposed in said exhaust pipe for recording pressure.

7. The exhaust system according to claim 1, wherein said sensor is a gas sensor.

8. The exhaust system according to claim 7, wherein said sensor is suitable for recording a nitrogen oxide concentration in the exhaust gas.

9. The exhaust system according to claim 7, wherein said sensor is suitable for recording a hydrocarbon concentration.

10. The exhaust system according to claim 1, which further comprises at least one component disposed in said exhaust pipe for at least partially converting the pollutants.

11. The exhaust system according to claim 10, wherein said at least one component is at least one catalytic converter.

12. The exhaust system according to claim 10, which further comprises a muffler disposed in said exhaust pipe, said first position being directly downstream of said component, and said sensor being disposed downstream of said muffler.

13. A method for determining pollutant concentration in an exhaust gas, which comprises:

provvidng an internal combustion engine exhaust system having a first position and a second position;

recording a measured value with a sensor disposed at the second position for determining the pollutant concentration at the first position;

transmitting the measured value to a time function element taking into account a time difference between a measured value recording at the first and second positions; and transmitting the measured value, temporally correlated to other undelayed measured values, to a diagnosis unit.

14. The method according to claim 13, which further comprises determining, with the time function element, a time difference required by a unit volume of the exhaust gas to flow from the first position to the second position, during operation of the exhaust system.

15. The method according to claim 13, which further comprises determining exhaust-gas mass flow on the basis of a quantity of a fuel/air mixture passed into the internal combustion engine.

16. The method according to claim 13, which further comprises recording exhaust-gas temperature.

17. The method according to claim 13, which further comprises carrying out the step of determining the time difference at least as a function of at least one of a determined exhaust-gas mass flow and an exhaust-gas temperature.

18. The method according to claim 13, which further comprises transmitting data from the diagnosis unit to a control device of the internal combustion engine, for influencing operating performance of the internal combustion engine as a function of the data received.

19. The method according to claim 13, which further comprises carrying out the step of determining the time difference with a stored data model.

20. The method according to claim 19, which further comprises storing information about a volume of the exhaust system in the data model.

21. The method according to claim 19, which further comprises storing information in the data model regarding operating performance of components for at least partially converting the pollutants disposed in the exhaust system.

22. The method according to claim 21, which further comprises monitoring, with the diagnosis unit, the operating performance of the at least one component for converting at least one pollutant component.

23. The method according to claim 13, which further comprises monitoring operating performance of the internal combustion engine, with the diagnosis unit.

24. The method according to claim 23, which further comprises monitoring individual combustion chambers of the internal combustion engine in the monitoring step.

25. The method according to claim 24, which further comprises additionally recording pressure in the exhaust system at the second position with a measured-value pickup, and determining the time difference as a function of the recorded pressure.

* * * * *